United States Patent [19]

Cohen

[11] 4,173,487
[45] Nov. 6, 1979

[54] PROCESS FOR TREATING CEMENT PLANT DUST CATCH

[75] Inventor: Sidney M. Cohen, Allentown, Pa.

[73] Assignee: Fuller Company, Catasauqua, Pa.

[21] Appl. No.: 639,539

[22] Filed: Dec. 10, 1975

Related U.S. Application Data

[63] Continuation-in-part of Ser. No. 512,576, Oct. 7, 1974, abandoned.

[51] Int. Cl.² .............................................. C04B 7/04
[52] U.S. Cl. .................................................. 106/103
[58] Field of Search ................................ 106/100, 103

[56] References Cited

U.S. PATENT DOCUMENTS

| | | | |
|---|---|---|---|
| 2,477,262 | 7/1949 | Mooser | 106/100 |
| 2,863,726 | 12/1958 | Kamlet | 106/103 X |
| 2,871,133 | 1/1959 | Palonen et al. | 106/100 |
| 3,451,665 | 6/1969 | Strassen | 106/100 X |
| 3,622,363 | 11/1971 | Van Dornick | 106/100 |
| 3,870,534 | 3/1975 | Van Dornick | 106/100 |

Primary Examiner—Helen M. McCarthy
Attorney, Agent, or Firm—Frank H. Thomson

[57] ABSTRACT

A process for treating the dust catch from a cement manufacturing operation for producing cement clinker. The process includes blending the dust catch from a cement manufacturing operation with appropriate additives to produce a feed material. The blended feed material is pelletized and then supplied to a rotary kiln where it is burned at reducing conditions to produce cement clinker. The product discharged from the kiln is cooled and the exhaust gases from the kiln are quenched and the particulates collected. The process can be used to produce an alkali rich product from the exhaust system.

8 Claims, 2 Drawing Figures

PROCESS FOR TREATING CEMENT PLANT DUST CATCH

BACKGROUND OF THE INVENTION

This application is a continuation in part of U.S. patent application Ser. No. 512,576, filed Oct. 7, 1974 now abandoned.

The present invention relates to a process for recovering values from cement plant dust and in particular a process for producing cement clinker from the dust of a conventional cement producing plant.

With conventional cement producing systems, the exhaust gases from the clinker producing operation are filtered through a high efficiency dust collector such as a fabric filter to remove particulate material. This particulate material is conventionally stored on a waste pile. This dust catch often contains relatively large amounts of oxides of sodium and potassium, commonly called alkalies, which are undesirable compounds in cement clinker. In addition, this dust catch may contain large amounts of oxides of sulfur and may be low in certain cement forming compounds. As a result, the dust catch is considered to be a waste product. Continued storage of the dust catch in piles adjacent a cement plant becomes an environmental problem. It would be desirable to find some means for employing this dust catch to produce a useful product, not only to save raw materials, but also to substantially reduce an environmental problem.

Since it is known that the dust catch contains some useful cement making components, but are generally high in undesirable oxides of potassium and sodium and oxides of sulfur, if the cement making compounds can be properly proportioned and burned so as to drive off the alkalies and sulfur without losing cement making raw materials, cement clinker can be produced from the dust catch. If the alkalies can be concentrated to a large enough percentage, they can be used for fertilizer because of the high potential percentages of potassium present.

Prior to the present invention, no process was known which was capable of producing cement clinker from the dust catch of a conventional cement making operation which substantially eliminated the alkalies in the cement clinker formed in the process. Prior processes resulted in volatilized alkalies condensing on the feed material which resulted in alkali build up in the product. Those processes which have been tried required the addition of large amounts of new cement making compounds and, therefore, did not result in the complete utilization of the raw material value in the dust catch. One such process is shown in U.S. Pat. No. 2,687,290.

Also known prior to the present invention are techniques of using the dust catch of a clinkering operation wherein the dust catch from the kiln is blown into the combustion zone of the kiln from the discharge end of the kiln to be combined with the raw material being clinkered in the kiln. Such an arrangement is shown in U.S. Pat. No. 3,206,526, and a similar process is described in U.S. Pat. No. 2,477,262. Although this type of system may perform satisfactorily in certain applications, the chemical analysis of the dust catch may be such that this type of system cannot be used or a portion of the dust catch, such as high alkali dust, must first be removed.

Although the technique of returning the dust catch to the conventional clinkering kiln from which it originated may solve a future build up of dust, it will not solve the problem sought to be solved by the present invention because the amount of dust which can be returned with the prior technique is limited. It is believed that the prior technique can be used to eliminate dust which has built up over a period of years and must now be disposed of.

With the present invention dust having an alkali level of up to 6% can be processed in its own clinkering operation. The system is not combined with a normal clinkering operation as is the case with prior apparatus for treating dust. This means that not only can the dust catch of current cement making operation be used, but also the dust that has accumulated over a period of years can be utilized.

SUMMARY

It is, therefore, the principle object of this invention to provide a process of treating the dust catch from a cement manufacturing operation for producing a useful product.

It is a further object of this invention to provide a process of treating a dust catch from a cement manufacturing operation for producing cement clinker with a minimum of alkalies and sulfur.

It is a still further object of this invention to provide a process for treating the dust catch from cement manufacturing operations which can be used to treat preexisting and future dust accumulations.

These and other objects will be carried out by providing the process of treating the dust catch from a cement manufacturing operation having alkali compounds of up to 6% to produce cement clinker comprising the steps of analyzing the dust catch and determining the cement clinker which would be produced if the dust catch is burned; producing feed material by adding to the dust catch sufficient raw materials to chemically adjust the dust catch to produce cement clinker having the desired analysis when the feed material is burned; pelletizing the feed material; burning the feed material in a furnace at reducing conditions at a temperature sufficient to volatilize alkalies and sulfur from the feed material; discharging cement clinker from the furnace; and discharging volatilized alkalies from the furnace with the exhaust gases.

BRIEF DESCRIPTION OF THE DRAWINGS

The invention will be described with the annexed drawings wherein.

DESCRIPTION OF THE PREFERRED EMBODIMENT

In a conventional cement manufacturing operation, raw materials are burned at clinkering temperatures in a furnace such as a rotary kiln. The exhaust gases from the furnace will entrain fine particles of the raw material being supplied to the furnace. These fine particles of raw material will be collected in a high efficiency dust collector such as a fabric filter or electro static precipitator. The collected particles are herein referred to as "dust catch". These particles contain valuable raw material, but will probably also include undesirable compounds which are volatilized in the cement making operation. In order to make a useful product such as cement clinker from this dust catch, the valuable compounds of the dust catch must be utilized and the undesirable compounds must be removed. A typical analysis of a dust catch from a conventional cement manufacturing operation is shown in Table 1, Example A. If this raw material were subjected to clinkering temperatures in a furnace such as a rotary kiln, 90 to 95% of the $K_2O$, 80% of the $NA_2O$ and up to 90% of the $SO_3$ will be volatilized in the burning zone. This will result in a kiln product having an analysis as shown in Table 2, Example A, if the alkalies are not recondensed on the incoming feed. This product has a higher than desired $C_3S$ content for a good cement clinker. In order to produce the desired product adjustment of the feed material is required. In the example illustrated, correction can be achieved by adding 1% of a typical shale to give a raw material feed and a clinker product as shown in Table 3, Example A to thereby produce a good type Portland cement clinker.

Another typical dust catch from a conventional cement manufacturing operation is shown in Table 1, Example B. If this raw material were subjected to clinkering temperatures in a rotary kiln 92% of the $K_2O$; 35% of the $NA_2O$ and 88% of the $SO_3$ will be volatilized in the burning zone. This would result in a kiln product having an analysis as shown in Table 2, Example B if the alkalis are not recondensed on the incoming feed. This product has much lower than desired $C_3S$ content for a desired cement clinker. In order to produce the desired product, adjustment of the feed material is required. In the sample illustrated, correction of the raw material is achieved by adding 29.5% limestone and 3.5% of a typical high silica sand to give a raw material feed and a clinker product shown in Table 3, Example B, to thereby produce an acceptable Portland cement clinker.

The present invention is capable of utilizing raw material having a higher alkali level than with prior practice including processes wherein dust is returned to the burning zone of the kiln from which the dust originated. Cement clinker can be made with raw material having an alkali content of up to 6%.

Figure 1:
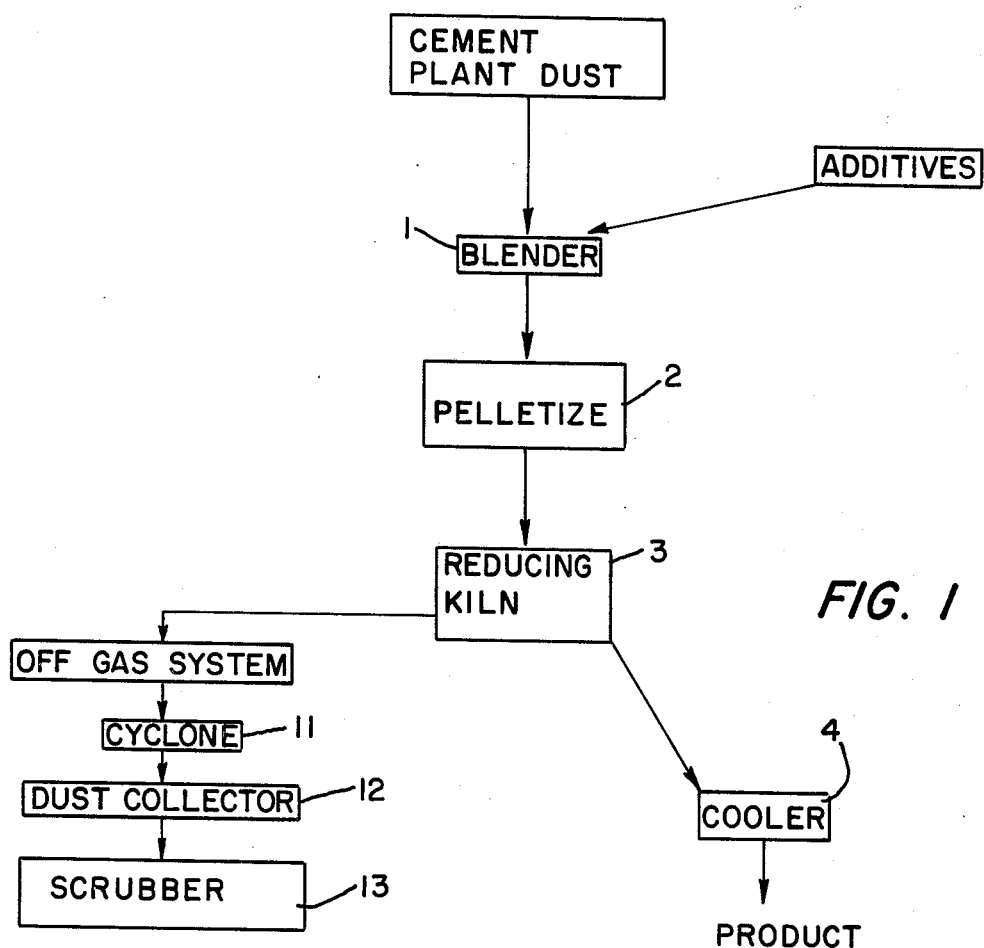
FIG. 1 is a flow diagram of the process of the present invention.

Therefore, the first step in the process is to analyze the dust catch values and determine the product which could be produced if the dust catch were burned at clinkering temperatures of about 2600° F. which is sufficient to volatalize the alkalies and the alkalies were not recondensed on the incoming feed. The second step is to chemically adjust this material by adding to the dust catch raw materials which when burned with the dust catch will produce a clinker having the desired chemical analysis. These two materials are each supplied to a suitable dry blending system to produce a homogeneous feed material. The blender has been designated by the numeral 1 in FIGS. 1 and 2.

The homogeneous feed material is then supplied to a pelletizer 2 which may take the form of an extruder, a briquetter or a drum or disc pelletizer of a well-known construction. Depending upon the type of pelletizer used, it may be desirable to add a small amount of water to bind the feed material. The pelletizing of the feed material reduces the amount of raw material which will be entrained in the furnace exhaust gases which could contaminate a potential high alkali by-product and insures that the material passes through the kiln instead of being blown out of the back of the kiln with the exhaust gases.

From the pelletizer, the feed material is supplied to the feed end of a rotary kiln 3 for burning at clinkering temperatures. The burner is located at the discharge or opposite end of the kiln. The material passes through the kiln countercurrent to the flow of combustion gases as in a conventional clinkering operation. It has been found that the furnace may be a rotary kiln which has a length to diameter ratio smaller than a kiln used for making clinker from all raw material. It is important that the kiln have a high back end temperature (preferably in excess of 1500° F.) to insure complete emission in a vapor state of the alkalies volatilized. In order to insure that the alkalis are discharged in a vapor state, it is preferred that the temperature of the exhaust gases discharged from the feed end of the kiln be maintained at between 1400 and 1800° F. It is necessary to insure that the undesirable alkalies, namely the potassium and sodium oxides and the sulfur oxides be discharged in a gaseous state and at a temperature sufficiently high to prevent them from recondensing on the feed material. This is required because the feed material is relatively high in alkali content and the level of alkali in the cement clinker produced is limited by ASTM specifications. If the volatilized alkalies condensed on the feed material, there would be an undesirable build up of alkalies in the product.

The kiln is burned at a slightly reducing condition in order to decompose any of the sulfur which may be combined with the calcium in the dust as calcium sulphate. It is important to utilize all of the useful calcium compounds in the dust catch being processed in order to form a good cement clinker and reduce the amount of raw material which must be added to the dust catch. This is accomplished by the slightly reduced conditions in the furnace. The reducing conditions in the kiln can be maintained by the addition of carbon in the form of coal, coke or heavy fuel oil to the raw mix before pelletization. Reducing conditions can also be maintained by burning with insufficient air in the kiln. Not only is it desirable to utilize all of the calcium compounds, but also, if the calcium sulphate is volatilized as a calcium sulphate vapor, it will result in a sticky condition in the exhaust system when it recondenses. This sticky condition can result in a build-up in the feed and exhaust systems. In addition, calcium sulphate in the hot zone of the kiln may cause an undesirable melting of the kiln charge since its melting point is below the 2600° F. clinkering temperature. Therefore, the two important criteria in the kiln are a high back end temperature and burning at reducing conditions.

The product discharged from the kiln is cooled in a conventional clinker cooler 4 and is discharged as product. The hot gases discharged from the feed end of the kiln are immediately quenched by either a water spray or cool air in order to prevent the alkalies from passing through the sticky phase and recondensing on the exhaust system duct work. The dust catch from the system of the present invention will be high in alkali content and may be used for fertilizer if the alkali values are sufficiently high.

It may be desirable to use the process of the present invention to produce a fertilizer by adjusting the feed material to achieve this high alkali value in the dust. In such an arrangement it may be possible to produce fertilizer alone or cement clinker and fertilizer.

Figure 2:
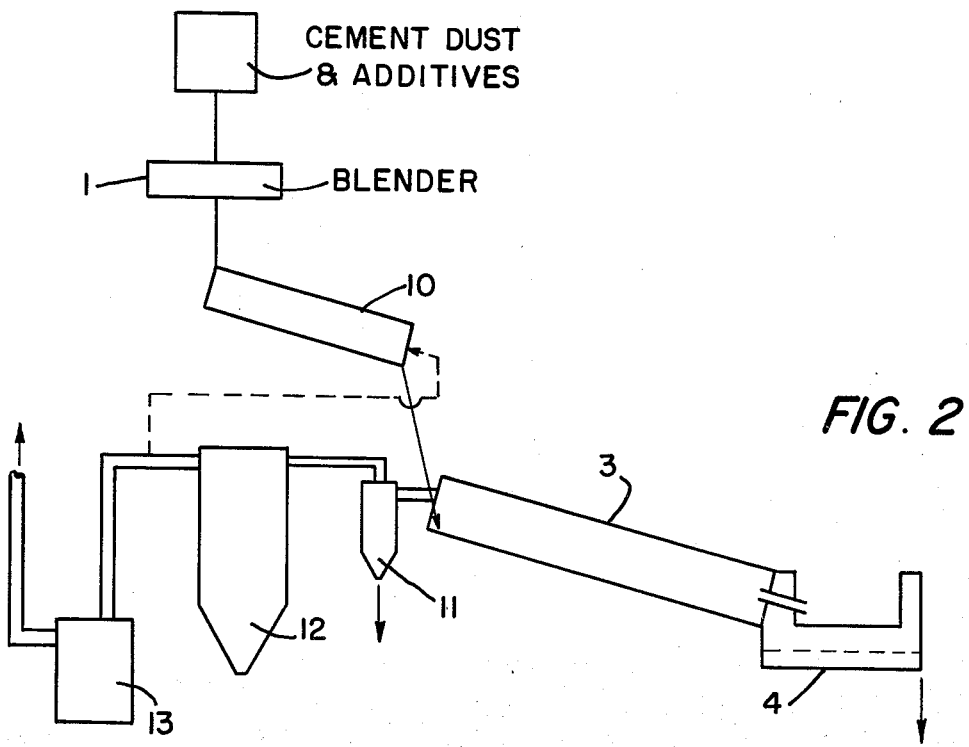
FIG. 2 is a diagrammatic view of a modification of the present invention.

In a modified embodiment, as shown in FIG. 2, it may be desirable to utilize some of the exhaust gases from the kiln to dry the product from the pelletizing section 2. A rotary dryer 10 has been shown in FIG. 2 for this purpose, but other types of dryers such as a tray dryer may be used.

A conventional pollution control system is provided and may include a cyclone 11 and high efficiency dust collector 12.

If the system is high in oxides of sulfur, it may be desirable to add a scrubbing system 13 to remove these sulfur oxides. In the embodiment shown in FIG. 2, the take off point for the dryer gases is preferably located between the dust collector and the scrubber.

If the dust to be processed contains calcium sulphate in amounts greater than 10%, powdered coal in an amount up to 5% may be added in the blender. This coal will insure the decomposition of the calcium sulphate with the sulfur being removed in the form of $SO_2$, and the CaO will be retained for compounding with the other components in the process of making cement clinker.

From the foregoing it can be seen that cement clinker can be made from raw material which heretofore has been discarded. This is accomplished by appropriately adjusting the dust catch. The dust catch can be adjusted to manufacture cement clinker or high alkali fertilizer, or both.

TABLE 1

| | Kiln Dust Catch | |
|---|---|---|
| | Example A | Example B |
| $SiO_2$ | 15.74 | 14.35 |
| $Al_2O_3$ | 4.60 | 5.85 |
| $Fe_2O_3$ | 2.34 | 2.33 |
| CaO | 50.50 | 41.70 |
| MgO | 1.57 | 1.00 |
| $K_2O$ | 2.48 | 4.24 |
| $Na_2O$ | 0.28 | 0.15 |
| $SO_3$ | 12.35 | 4.9 |
| LOI | 10.76 | 25.16 |
| Total | 100.62 | 99.68 |

TABLE 2

| | Kiln Product | |
|---|---|---|
| | Example A | Example B |
| $SiO_2$ | 20.84 | 21.80 |
| $Al_2O_3$ | 6.09 | 8.92 |
| $Fe_2O_3$ | 3.09 | 3.57 |
| CaO | 66.87 | 62.20 |
| MgO | 2.03 | 1.52 |
| $K_2O$ | 0.28 | 0.49 |
| $Na_2O$ | 0.06 | 0.13 |
| $SO_3$ | 0.69 | 0.76 |
| LOI | 0.00 | 0.00 |
| Total | 100.00 | 99.39 |
| Calc. Cement Compounds | 68.3 | 22.8 |
| $C_3S$ (Tricalcium Silicate) | 8.3 | 54.9 |
| $C_2S$ (Dicalcium Silicate) | 11.0 | 17.6 |
| $C_3A$ (Tricalcium Aluminate) | 9.4 | 10.9 |
| $C_4AF$ (Tetracalcium Aluminoferrite) | | |

Table 3

| Example A | | | |
|---|---|---|---|
| | Raw Feed after Blend of 1.0% Shale | Clinker Product after Controlled Volatilization | Typical Dust Catch Products |
| $SiO_2$ | 16.11 | 21.33 | 1.60 |
| $Al_2O_3$ | 4.71 | 6.23 | 0.70 |
| $Fe_2O_3$ | 2.32 | 3.07 | 0.50 |
| CaO | 50.04 | 66.27 | 4.59 |

Table 3-continued

| Example A | | | |
|---|---|---|---|
| | Raw Feed after Blend of 1.0% Shale | Clinker Product after Controlled Volatilization | Typical Dust Catch Products |
| MgO | 1.57 | 2.08 | 0.15 |
| $K_2O$ | 2.48 | 0.28 | 42.40 |
| $Na_2O$ | 0.28 | 0.06 | 3.12 |
| $SO_3$ | 12.26 | 0.68 | 44.73 |
| Loss | 10.78 | 0.00 | 0.56 |
| Total | 100.55 | 100.00 | 98.35 |
| $C_3S$ (Tricalcium Silicate) | | 60.3 | |
| $C_2S$ (Dicalcium Silicate) | | 15.7 | |
| $C_3A$ (Tricalcium Aluminate) | | 11.4 | |
| $C_4AF$ (Tetracalcium Aluminoferrite) | | 9.3 | |

| Example B | | | |
|---|---|---|---|
| | Raw Feed after Blend of 29.57 Limestone and 3.57 Typical High Silica Sand | Clinker Product after Controlled Volatilization | Typical Dust Catch Products |
| $SiO_2$ | 13.72 | 21.33 | 4.78 |
| $Al_2O_3$ | 4.20 | 6.53 | 2.01 |
| $Fe_2O_3$ | 1.74 | 2.70 | 1.97 |
| CaO | 43.52 | 66.93 | 20.40 |
| MgO | 0.94 | 1.46 | 0.58 |
| $K_2O$ | 2.88 | 0.45 | 32.00 |
| $Na_2O$ | 0.12 | 0.09 | 1.30 |
| $SO_3$ | 3.28 | 0.51 | — |
| Loss | 29.31 | 0.00 | 35.11 |
| Total | 99.71 | 100.00 | 102.05 |
| $C_3S$ (Tricalcium Silicate) | | 62.7 | |
| $C_2S$ (Dicalcium Silicate) | | 14.0 | |
| $C_3A$ (Tricalcium Aluminate) | | 12.7 | |
| $C_4AF$ (Tetracaicium Aluminoferrite) | | 8.2 | |

I claim:

1. The process of treating the dust catch from a cement manufacturing operation having alkali compounds of up to 6% comprising the steps of:
   analyzing the dust catch and determining the cement clinker which would be produced if the dust catch is burned and alkali and sulfur volatilization is achieved;
   producing feed material by adding to the dust catch sufficient raw materials to chemically adjust the dust catch to produce cement clinker having the desired analysis when the feed material is burned;
   pelletizing the feed material;
   burning the feed material in a furnace at reducing conditions at a temperature sufficient to volatilize alkalies and sulfur from the feed material;
   discharging cement clinker from the furnace; and
   discharging volatilized alkalies from the furnace with the exhaust gases.

2. The process of treating the dust catch from a cement manufacturing operation according to claim 1 wherein the exhaust gases are discharged from the furnace at a temperature between 1400° and 1800° F.

3. The process of treating the dust catch from a cement manufacturing operation according to claim 2 further comprising the step of dry blending the dust catch and added raw materials to produce the feed material.

4. The process of treating the dust catch from a cement manufacturing operation according to claim 3 further comprising the step of quenching the exhaust gases after they are discharged from the furnace.

5. The process of producing cement clinker from the dust catch from a cement manufacturing operation comprising the steps of:
   analyzing the dust catch and determining the product which will be produced if the dust catch is burned at cement clinkering temperatures;
   chemically adjusting the dust catch by adding the raw materials necessary to produce a feed material which will produce cement clinker having the desired chemical composition when the feed material is burned at cement clinkering temperatures;
   supplying the feed material to the feed end of a rotary kiln;
   burning the feed material in the rotary kiln at reducing conditions and cement clinkering temperature to produce cement clinker of the desired chemical composition;
   discharging cement clinker from the discharge end of the rotary kiln; and
   discharging exhaust gases and volatilized alkalies from the feed end rotary kiln.

6. The process of producing cement clinker according to claim 5 wherein the exhaust gases and volatilized alkalies are discharged from the kiln at a temperature sufficient to insure substantially complete emission of the alkalies as a vapor.

7. The process of producing cement clinker according to claim 6 further comprising the step of pelletizing the dust catch and added raw materials before burning the dust catch and raw materials.

8. The process of producing cement clinker according to claim 7 further comprising the step of quenching the exhaust gases and volatilized alkalies after they are discharged from the rotary kiln.

* * * * *